United States Patent
Shen et al.

(10) Patent No.: US 11,299,594 B2
(45) Date of Patent: Apr. 12, 2022

(54) CARBINOL-FUNCTIONAL SILICONE RESIN, AND METHOD FOR PRODUCING SILICONE-MODIFIED POLYESTER

(71) Applicant: DOW SILICONES CORPORATION, Midland, MI (US)

(72) Inventors: Guodong Shen, Shanghai (CN); Wenjie Chen, Shanghai (CN); Zhihua Liu, Shanghai (CN)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/048,167

(22) PCT Filed: Apr. 18, 2018

(86) PCT No.: PCT/CN2018/083486
§ 371 (c)(1),
(2) Date: Oct. 16, 2020

(87) PCT Pub. No.: WO2019/200555
PCT Pub. Date: Oct. 24, 2019

(65) Prior Publication Data
US 2021/0155759 A1 May 27, 2021

(51) Int. Cl.
| | | |
|---|---|---|
| *C08G 77/445* | (2006.01) | |
| *C08G 77/38* | (2006.01) | |
| *C08G 63/695* | (2006.01) | |
| *C08G 77/18* | (2006.01) | |
| *C09D 167/02* | (2006.01) | |

(52) U.S. Cl.
CPC ....... *C08G 77/445* (2013.01); *C08G 63/6954* (2013.01); *C08G 77/18* (2013.01); *C08G 77/38* (2013.01); *C09D 167/02* (2013.01)

(58) Field of Classification Search
CPC ....... C08G 77/38; C08G 77/445; C08L 83/06; C09D 183/06
See application file for complete search history.

(56) References Cited

U.S. PATENT DOCUMENTS

| | | | | |
|---|---|---|---|---|
| 2,887,467 A * | 5/1959 | Krantz | ................... | C08G 77/00 |
| | | | | 528/29 |
| 4,452,961 A * | 6/1984 | Koerner | ............... | C08G 63/695 |
| | | | | 428/447 |
| 4,608,421 A | 8/1986 | Lin | | |
| 4,749,764 A * | 6/1988 | Koerner | ................. | C08G 77/18 |
| | | | | 525/474 |
| 5,227,435 A | 7/1993 | Kang et al. | | |
| 7,811,619 B2 * | 10/2010 | Itaya | ......................... | A23F 3/40 |
| | | | | 426/597 |
| 2005/0136267 A1 | 6/2005 | Greene et al. | | |
| 2006/0235142 A1 | 10/2006 | Hostman et al. | | |
| 2007/0021579 A1 | 1/2007 | Greene et al. | | |
| 2011/0046257 A1 * | 2/2011 | Webster | ............... | C08G 77/445 |
| | | | | 522/148 |

FOREIGN PATENT DOCUMENTS

| | | |
|---|---|---|
| CN | 102167807 A | 8/2011 |
| CN | 102838740 A | 12/2012 |
| CN | 103450465 A | 12/2013 |
| WO | 2005037891 A1 | 4/2005 |
| WO | 2015094817 A1 | 6/2015 |

OTHER PUBLICATIONS

International Search Report for PCT/CN2018/083486 dated Jan. 24, 2019, 3 pages.
Machine assisted English translation of CN103450465A obtained from https://patents.google.com/patent on Oct. 15, 2020, 10 pages.
Machine assisted English translation of CN102838740A obtained from https://patents.google.com/patent on Oct. 15, 2020, 14 pages.
Machine assisted English translation of CN102167807A obtained from https://patents.google.com/patent on Nov. 15, 2021, 7 pages.

* cited by examiner

*Primary Examiner* — Marc S Zimmer
(74) *Attorney, Agent, or Firm* — Warner Norcross + Judd LLP

(57) ABSTRACT

Provided herein is a carbinol-functional silicone resin. The carbinol-functional silicone resin is prepared by reacting a raw silicone resin having at least 1 mass % of silicon atom-bonded hydroxyl groups, silicon atom-bonded alkoxy groups, or a combination thereof, and a dihydroxy-functional compound, in the presence of a condensation catalyst and a solvent. The carbinol-functional silicone resin can produce a solid silicone-modified polyester without gelation of the silicone resin.

16 Claims, No Drawings

CARBINOL-FUNCTIONAL SILICONE RESIN, AND METHOD FOR PRODUCING SILICONE-MODIFIED POLYESTER

CROSS-REFERENCE TO RELATED APPLICATIONS

This application claims priority to and is the National Stage of International Appl. No. PCT/CN2018/083486 filed on 18 Apr. 2018, the content of which is hereby incorporated by reference.

TECHNICAL FIELD

The present invention relates to a carbinol-functional silicone resin, and a method for producing a silicone-modified polyester.

BACKGROUND ART

Silicone-modified polyesters are frequently used for cookware coatings or for electrical domestic appliance such as coatings for steam irons. The silicone-modified polyesters are suitable to be formed into stable particulates such as flake or powder. Powdery silicone-modified polyesters are deposited on a substrate, then baked to form a coated substrate.

It is known that the silicone-modified polyester can be produced by reacting a polyester and a silicone resin. For example, both U.S. Patent Application Publication Nos. 2005/0136267 A1 and 2007/0021579 A1 disclose a method of producing a silicone-modified polyester, comprising the following steps: 1) esterifying a polyhydroxy-functional compound with a polycarboxyl-functional compound or derivative thereof to form a polyester; and 2) reacting the polyester and a silicone resin having silicon atom-bonded hydroxyl groups to produce a silicone-modified polyester. However, when the polyester and the silicone resin are reacted without using a solvent, there is a problem that the silicone resin gels. Therefore, the solvent is needed to prevent the silicone resin from gelling.

While, it is known that the silicone-modified polyester can be produced by reacting a carbinol-functional silicone resin and polycarboxyl-functional compound. For example, U.S. Pat. No. 5,227,435 A discloses a method of producing a silicone-modified polyester, comprising the following steps: 1) condensation reacting silicone resin with a alcohols having at least two hydroxyl groups (e.g., neopentyl glycol, diethylene glycol); 2) reacting a resin prepared by the step 1) with acidic compounds in the presence of esterification catalyst; and 3) reacting a resin prepared by the step 2) with trimellitic anhydride in the presence of catalyst to form polyester resins; Chinese Patent Application Publication No. 103450465 A discloses a method for producing a silicone-modified polyester, comprising the following steps: 1) reacting a polyol (e.g., trishydroxymethylpropane, neopenthyl glycol, and trimethylol ethan) and a silicone resin, in the presence of a polymerization catalyst; and 2) reacting a polybasic acid with a reactant obtained in the step 1); and International Publication No. WO 2015/094817 A1 discloses a method for producing a silicone-modified polyester, comprising the following steps: 1) reacting a silicone resin and a polyol (e.g., neopentyl glycol, trimethylol ethane) in the presence of a condensation catalyst to produce a siliconized hydroxy-functional polymer; and 2) esterifying the siliconized hydroxy-functional polymer with a polycarboxyl-functional compound or derivative thereof to form a silicone-modified polyester. However, there is also a problem that the silicone resin is gelled in the reaction above.

PRIOR ART DOCUMENTS

Patent Documents

Patent Document 1: U.S. Patent Application Publication No. 2005/0136267 A1
Patent Document 2: U.S. Patent Application Publication No. 2007/0021579 A1
Patent Document 3: U.S. Pat. No. 5,227,435 A
Patent Document 4: Chinese Patent Application Publication No. 103450465 A
Patent Document 5: International Publication No. WO 2015/094817 A1

SUMMARY OF INVENTION

Technical Problem

An object of the present invention is to provide a novel carbinol-functional silicone resin suitable for an intermediate to produce a solid silicone-modified polyester. Another object of the present invention is to provide a method of producing a solid silicone-modified polyester suitable for a powder coating, without gelation of a raw silicone resin.

Solution to Problem

The carbinol-functional silicone resin of the present invention is prepared by reacting a raw silicone resin having at least 1 mass % of silicon atom-bonded hydroxyl groups, silicon atom-bonded alkoxy groups, or a combination thereof, and a dihydroxy-functional compound, in the presence of a condensation catalyst and a solvent, wherein the raw silicone resin is represented by the following compositional formula:

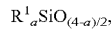
$R^1_a SiO_{(4-a)/2}$, wherein $R^1$ is a monovalent hydrocarbon group having 1 to 12 carbon atoms, and "a" is a number of from 0.8 to 1.8, and wherein the dihydroxy-functional compound is represented by the following general formula:

HO—$(R^2O)_n$—H, wherein $R^2$ is an alkylene group having 2 to 12 carbon atoms, and "n" is 0 or 1.

The raw silicone resin is preferably a silicone resin represented by the following average unit formula:

$R^1 SiO_{3/2}$, wherein $R^1$ is defined above.

The dihydroxy-functional compound is preferably a compound selected from a group consisting of an ethylene glycol, propylene glycol, 1,3-butanediol, 1,4-butanediol, 1,5-pentanediol, 1,6-hexanediol, 2-methyl-1,3-propanediol, neopentyl glycol, and a 2-butyl-2-ethyl-1,3-propanediol.

The dihydroxy-functional compound is reacted with the raw silicone resin in an amount such that a mole ratio of hydroxyl groups in the dihydroxy-functional compound per silicon atom-bonded hydroxyl groups, silicon atom-bonded alkoxy groups, or a combination thereof in the raw silicone resin is preferably in a range of from 0.5 to 2.0.

The condensation catalyst is preferably a catalyst including metal ligand complexes.

The reaction is preferably carried out at a temperature of not more than 150° C.

The method for producing a silicone-modified polyester of the present invention, comprises the following steps:
1) reacting a raw silicone resin having at least 1 mass % of silicon atom-bonded hydroxyl groups, silicon atom-bonded alkoxy groups, or a combination thereof, and a dihydroxy-functional compound, in the presence of a condensation catalyst and a solvent to produce a carbinol-functional silicone resin; and
2) esterifying the crabinol-functional silicone resin, a polyhydroxy-functional compound and a polycarboxyl-functional compound or derivative thereof without using a solvent to form the silicone-modified polyester, wherein the raw silicone resin is represented by the following compositional formula:

$$R^1_a SiO_{(4-a)/2},$$

wherein $R^1$ is a monovalent hydrocarbon group having 1 to 12 carbon atoms, and "a" is a number of from 0.8 to 1.8, and wherein the dihydroxy-functional compound is represented by the following general formula:

$$HO-(R^2O)_n-H,$$

wherein $R^2$ is an alkylene group having 2 to 12 carbon atoms, and "n" is 0 or 1.

The raw silicone resin is preferably a silicone resin represented by the following average unit formula:

$$R^1 SiO_{3/2},$$

wherein $R^1$ is defined above.

The dihydroxy-functional compound is preferably a compound selected from a group consisting of an ethylene glycol, propylene glycol, 1,3-butanediol, 1,4-butanediol, 1,5-pentanediol, 1,6-hexanediol, 2-methyl-1,3-propanediol, neopentyl glycol, and a 2-butyl-2-ethyl-1,3-propanediol.

The dihydroxy-functional compound is reacted with the raw silicone resin in an amount such that a mole ratio of hydroxyl groups in the dihydroxy-functional compound per silicon atom-bonded hydroxyl groups, silicon atom-bonded alkoxy groups, or a combination thereof in the raw silicone resin is preferably in a range of from 0.5 to 2.0.

The condensation catalyst is preferably a catalyst including metal ligand complexes.

The step 1) is preferably carried out at a temperature of not more than 150° C.

The polyhydroxy-functional compound is preferably a compound selected from a group consisting of a glycerin, trimethylolpropane, trimethylolethane, trishydroxyethylisocyanurate, pentaerythritol, ethylene glycol, diethylene glycol, propylene glycol, trimethylene glycol, 1,3-, 1,2- and 1,4-butanediols, heptanediol, hexanediol, octanediol, 2,2'-bis (4-cyclohexanol)propane, neopentyl glycol, 2,2,3-trimethylpentane-1,3-diol, 1,4-dimethylolcyclohexane, and a 2,2,4-trimethylpentane diol.

The polycarboxyl-functional compound is preferably a compound selected from a groups consisting of a phthalic acid, phthalic anhydride, isophthalic acid, terephthalic acid, dimethyl terephthalate, benzophenone dicarboxylic acid, diphenic acid, 4,4-dicarboxydiphenyl ether, 2,5-pyridine dicarboxylic acid, 2,6-naphthalenedicarboxylic acid, 4-hydroxybenzoic acid, trimellitic acid, trimellitic anhydride, and combinations thereof.

The step 2) is preferably carried out at a temperature of not less than 150° C.

Effects of Invention

The carbinol-functional silicone resin of the present invention is novel and suitable for an intermediate to produce a solid silicone-modified polyester. Furthermore, the method of the present invention is suitable for a method of producing a solid silicone-modified polyester for a powder coating, without gelation of a raw silicone resin.

Definitions

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

DETAILED DESCRIPTION OF THE INVENTION

First, the carbinol-functional silicone resin of the present invention will be explained in detail.

The carbinol-functional silicone resin of the present invention is prepared by reacting a raw silicone resin having at least 1 mass % of silicon atom-bonded hydroxyl groups, silicon atom-bonded alkoxy groups, or a combination thereof, and a dihydroxy-functional compound, in the presence of a condensation catalyst and a solvent.

The raw silicone resin is represented by the following compositional formula:

$$R^1_a SiO_{(4-a)/2}.$$

In the formula, $R^1$ is a monovalent hydrocarbon group having 1 to 12 carbon atoms. Examples of the monovalent hydrocarbon groups include an alkyl group with $C_{1-12}$ carbon atoms, alkenyl group with $C_{2-12}$ carbon atoms, aryl group with $C_{6-12}$ carbon atoms, an aralkyl group with $C_{7-12}$ carbon atoms, and groups in which some or all of the hydrogen atoms bonded in these groups are substituted with halogen atoms. Specific examples thereof include alkyl groups, such as a methyl group, ethyl group, propyl group, butyl group, pentyl group, hexyl group, heptyl group, octyl group, nonyl group, decyl group, undecyl group, and a dodecyl group; alkenyl groups, such as a vinyl group, allyl group, butenyl group, pentenyl group, hexenyl group, heptenyl group, octenyl group, nonenyl group, decenyl group, undecenyl group, and a dodecenyl group; aryl groups, such as a phenyl group, tolyl group, xylyl group, and a naphthyl group; aralkyl groups, such as a benzyl group, and a phenethyl group; and groups in which some or all of the hydrogen atoms bonded in these groups are substituted with halogen atoms, such as a chlorine atom and bromine atom. Of these, the methyl group, the propyl group, and phenyl group are preferable. However, at least 50 mol % of $R^1$ are preferably aryl groups.

In the formula, "a" is a number of from 0.8 to 1.8, alternatively a number of from 0.8 to 1.6.

The raw silicone resin may be a silicone resin represented by the following average unit formula:

$$R^1 SiO_{3/2}.$$

In the formula, $R^1$ is defined above.

That is, the raw silicone resin may comprising: siloxane units represented by the following formula: $R^1 SiO_{3/2}$, however, it may comprise other siloxane units represented by the following formulae: $R^1_3 SiO_{1/2}$, $R^1_2 SiO_{2/2}$, and $SiO_{4/2}$. In the siloxane resin, the content of the siloxane unit represented by the formula: $R^1 SiO_{3/2}$ is not limited, but the siloxane resin preferably comprises: 40 to 100 mole % of the siloxane unit represented by the formula: $R^1 SiO_{3/2}$ based on the molar sum of these siloxane units. This is because the content of the siloxane unit is greater than or equal to the lower limit of the aforementioned range, thermal resistance and gloss of the coating is good.

The raw silicone resin has silicon atom-bonded hydroxyl groups and/or silicon atom bonded alkoxy groups. Examples of the silicon atom-bonded alkoxy groups include alkoxy groups with $C_{1-6}$ carbon atoms, such as methoxy groups, ethoxy groups, propoxy groups, and butoxy groups. The content of silicon atom-bonded hydroxyl groups, silicon atom-bonded alkoxy groups, or a combination thereof in the raw silicone resin is at least 1 mass %, alternatively in a range of from 1 to 50 mass %. This is because the content of silicon atom-bonded hydroxyl groups, silicon atom-bonded alkoxy groups, or a combination thereof is in the aforementioned range, reactivity of the raw silicone resin is good.

While, the dihydroxy-functional compound is represented by the following general formula:

$$HO-(R^2O)_n-H.$$

In the formula, $R^2$ is an alkylene group having 2 to 12 carbon atoms. Examples of the alkylene groups include an ethylene group, methylmethylene group, propylene group, butylene group, pentylene group, hexylene group, heptylene group, octylene group, nonylene group, decylene group, undecylene group, and a dodecylene group. Of these, the ethylene group and the propylene group are preferable.

In the formula, "n" is 0 or 1, alternatively 0.

Examples of the dihydroxy-functional compound include an ethylene glycol, propylene glycol, 1,3-butanediol, 1,4-butanediol, 1,5-pentanediol, 1,6-hexanediol, 2-methyl-1,3-propanediol, neopentyl glycol, and a 2-butyl-2-ethyl-1,3-propanediol.

The dihydroxy-functional compound is reacted with the raw silicone resin in an amount such that a mole ratio of hydroxyl groups in the dihydroxy-functional compound per silicon atom-bonded hydroxyl groups, silicon atom-bonded alkoxy groups, or a combination thereof in the raw silicone resin is preferably in a range of from 0.5 to 2.0.

The condensation catalyst is not limited, but is preferably a catalyst including metal ligand complexes. Examples of the condensation catalysts include organotitanium compounds such as tetraisopropyl titanate, tetrabutyl titanate, tetraoctyl titanate, titanium acetic acid salts, titanium diisopropoxybis(acetylacetonate), and titanium diisopropoxybis (ethyl acetoacetate); organozirconium compounds such as zirconium tetraacetylacetonate, zirconium hexafluoroacetylacetonate, zirconium trifluoroacetylacetonate, tetrakis(ethyltrifluoroacetylacetonate)zirconium, tetrakis(2,2,6,6-tetramethyl-heptanedionate), zirconium dibutoxybis (ethylacetoacetate), and zirconium diisopropoxybis(2,2,6,6-tetramethyl-heptanedionate); and organotin compounds such as dibutyltin dilaurate, dimethyltin dineodecanoate, dibutyltin diacetate, dimethylhydroxy(oleate)tin, and dioctyldilauryltin.

The content of condensation catalyst is not limited, but it is preferably in a range of from 100 to 10,000 ppm, alternatively in a range of from 100 to 1,000 ppm, in mass unit, in the mixture of the raw silicone resin and the dihydroxy-functional compound. This is because excellent reactivity is achieved.

In the reaction above, a solvent may be used to dissolve the raw silicone resin. Examples of the solvent include toluene, xylene, hexane, heptane, and a mixture thereof.

The content of the solvent is not limited, but it is preferably in a range of from 10 to 1,000 mass per 100 mass of the mixture of the raw silicone resin and the dihydroxy-functional compound.

In the reaction above, a monohydroxy-functional compound may be used to further prevent the raw silicone resin from gelling. The monohydroxy-functional compound is represented by the following general formula:

$$R^3OH.$$

In the formula, $R^3$ is an alkyl group having 2 to 6 carbon atoms. Examples of the alkyl groups include an ethyl group, methylmethyl group, n-propyl group, iso-propyl group, n-butyl group, iso-butyl group, tert-butyl group, n-pentyl group, iso-pentyl group, tert-pentyl group, n-hexyl group, iso-hexyl group, and a tert-hexyl group. Of these, the ethyl group, n-propyl group and n-butyl group are preferable.

Examples of the monohydroxy-functional compound include an ethyl alcohol, n-propyl alcohol, iso-propyl alcohol, n-butyl alcohol, iso-butyl alcohol, and a tert-butyl alcohol.

The content of the monohydroxy-functional compound is not limited, but it is preferably in an amount such that a mole ratio of hydroxyl groups in the monohydroxy-functional compound per silicon atom-bonded hydroxyl groups, silicon atom-bonded alkoxy groups, or a combination thereof in the raw silicone resin is in a range of from 0.01 to 0.5.

The temperature of the reaction is not limited, but it is preferably a temperature of not more than 150° C. Especially, the temperature at which the raw silicone resin and the dihydorxy-functional compound are mixed together is preferably in the range of 50 to 100° C., and then the reaction is preferably around 100 to 150° C., more preferably 100 to 130° C.

The carbinol-functional silicone resin of the present invention is suitable for an intermediate to produce a solid silicone-modified polyester without gelation of the silicone resin.

The method for producing a silicone-modified polyester of the present invention will now be explained in detail.

The method for producing a silicone-modified polyester of the present invention, which comprises the following steps:
1) reacting a raw silicone resin having silicon atom-bonded hydroxyl groups, silicon atom-bonded alkoxy groups, or a combination thereof, and a dihydroxy-functional compound, in the presence of a condensation catalyst and a solvent to produce a carbinol-functional silicone resin; and
2) esterifying the carbinol-functional silicone resin, a polyhydroxy-functional compound and a polycarboxyl-functional compound or derivative thereof without using a solvent to form the silicone-modified polyester.

The raw silicone resin is represented by the following compositional formula:

$$R^1{}_a SiO_{(4-a)/2}.$$

In the formula, $R^1$ is a monovalent hydrocarbon group having 1 to 12 carbon atoms, examples of which include, similar to above, alkyl groups, alkenyl groups, aryl groups, aralkyl groups, and groups in which some or all of the hydrogen atoms bonded in these groups are substituted with halogen atoms. Of these, the methyl group, the propyl group, and phenyl group are preferable. However, at least 50 mol % of $R^1$ are aryl groups.

In the formula, "a" is a number of from 0.8 to 1.8, alternatively a number of from 0.8 to 1.6.

The raw silicone resin may be a silicone resin represented by the following average unit formula:

$$R^1SiO_{3/2}.$$

In the formula, $R^1$ is defined above.

That is, the raw siloxane resin may comprising: siloxane units represented by the following formula: $R^1SiO_{3/2}$, however, it may comprise other siloxane units represented by the following formulae: $R^1{}_3SiO_{1/2}$, $R^1{}_2SiO_{2/2}$, and $SiO_{4/2}$. In the siloxane resin, the content of the siloxane unit represented by the formula: $R^1SiO_{3/2}$ is not limited, but the siloxane resin preferably comprises: 40 to 100 mole % of the siloxane unit represented by the formula: $R^1SiO_{3/2}$ based on the molar sum of these siloxane units. This is because the content of the siloxane unit is greater than or equal to the lower limit of the aforementioned range, thermal resistance and gloss of the coating is good.

The raw silicone resin has silicon atom-bonded hydroxyl groups and/or silicon atom bonded alkoxy groups. Examples of the silicon atom-bonded alkoxy groups include alkoxy groups with $C_{1-6}$ carbon atoms, such as methoxy groups, ethoxy groups, propoxy groups, and butoxy groups. The content of silicon atom-bonded hydroxyl groups, silicon atom-bonded alkoxy groups, or a combination thereof in the raw silicone resin is at least 1 mass %, alternatively in a range of from 1 to 50 mass %. This is because the content of silicon atom-bonded hydroxyl groups, silicon atom-bonded alkoxy groups, or a combination thereof is in the aforementioned range, reactivity of the raw silicone resin is good.

While, the dihydroxy-functional compound is represented by the following general formula:

$$HO-(R^3O)_n-H.$$

In the formula, $R^3$ is an alkylene group having 2 to 12 carbon atoms, examples of which include, similar to above alkylene groups. Of these, the ethylene group and the propylene group are preferable.

In the formula, "n" is 0 or 1, alternatively 0.

Examples of the dihydroxy-functional compound include similar to above.

The dihydroxy-functional compound is reacted with the raw silicone resin in an amount such that a mole ratio of hydroxyl groups in the dihydroxy-functional compound per silicon atom-bonded hydroxyl groups, silicon atom-bonded alkoxy groups, or a combination thereof in the raw silicone resin is preferably in a range of from 0.5 to 2.0.

The condensation catalyst is not limited, but is preferably a catalyst including metal ligand complexes, examples of which include, similar to above.

The content of condensation catalyst is not limited, but it is preferably in a range of from 100 to 10,000 ppm, alternatively in a range of from 100 to 1,000 ppm, in mass unit, in the mixture of the raw silicone resin and the dihydroxy-functional compound. This is because excellent reactivity is achieved.

In the step 1), a solvent is used to dissolve the raw silicone resin. Examples of the solvent include toluene, xylene, hexane, heptane, and a mixture thereof.

The content of the solvent is not limited, but it is preferably in a range of from 10 to 1,000 mass per 100 mass of the mixture of the raw silicone resin and the dihydroxy-functional compound.

In the step 1), a monohydroxy-functional compound may be used to further prevent the raw silicone resin from gelling. The monohydroxy-functional compound is represented by the following general formula:

$$R^3OH.$$

In the formula, $R^3$ is an alkyl group having 2 to 6 carbon atoms, examples of which include, similar to above alkyl groups. Of these, the ethyl group and the propyl group are preferable.

Examples of the monohydroxy-functional compound include similar to above.

The content of the monohydroxy-functional compound is not limited, but it is preferably in an amount such that a mole ratio of hydroxyl groups in the monohydroxy-functional compound per silicon atom-bonded hydroxyl groups, silicon atom-bonded alkoxy groups, or a combination thereof in the raw silicone resin is in a range of from 0.01 to 0.5.

The temperature of the step 1) is not limited, but it is preferably a temperature of not more than 150° C. Especially, the temperature at which the raw silicone resin and the dihydorxy-functional compound are mixed together is preferably in the range of 50 to 100° C., and then the reaction is preferably around 100 to 150° C., more preferably 100 to 130° C.

The polyhydroxy-functional compound is esterified with the polycarboxyl-functional compound or derivative thereof in the step 2). Examples of the polyhydroxy-functional compound include glycerin, trimethylolpropane, trimethylolethane, trishydroxyethylisocyanurate, pentaerythritol, ethylene glycol, diethylene glycol, propylene glycol, trimethylene glycol, 1,3-butanediol, 1,2-butanediol, 1,4-butanediol, heptanediol, hexanediol, octanediol, 2,2'-bis(4-cyclohexanol) propane, neopentyl glycol, 2,2,3-trimethylpentane-1,3-diol, 1,4-dimethylolcyclohexane, and 2,2,4-trimethylpentane diol.

The polycarboxyl-functional compound is reacted with the carbinol-functional silicone resin and the polyhydroxy-functional compound to form the silicone-modified polyester. The polycarboxyl-functional compound is not limited. Examples of the polycarboxyl-functional compound include benzene-1,2,4-tricarboxylic acid, phthalic acid, tetrahydraphthalic acid, hexahydrophthalic acid, endobicyclo-2,2,1-5-heptyne-2,3-dicarboxylic acid, tetrachlorophthalic acid, cyclohexanedioic acid, succinic acid, isophthalic acid, terephthalic acid, azelaic acid, maleic acid, trimesic acid, 3,6-dichlorophthalic acid, tetrachlorophthalic acid, adipic acid, sebacic acid, and combinations thereof. Isophtalic acid, neopentylglycol and trimethylolpropane or trimethylolethane are preferable.

In the step 2), a solvent is not needed. Since the solvent is not used in the esterification of the silicone resin, solid silicone-modified polyester can be produced.

The temperature of the step 2) is not limited, but it is preferably a temperature of not less than 150° C. Especially, the temperature at which the carbinol-functional silicone resin, the polyhydroxy-functional compound and the polycarboxyl-functional compound are mixed together is preferably in the range of 100 to 150° C., and then the esterifying reaction is preferably around 150 to 200° C.

The silicone-modified polyester produced by the method of the present invention is suitable for a coating on a substrate. The substrate is preferably made of aluminium, stainless steel, iron, plastics or glass.

The silicone-modified polyester may contain organic and/or inorganic pigment like titanium oxide or barium sulfate, binder that adheres to the surface to be treated, a carrier either an organic solvent or water that carries the ingredients but evaporates when the coating is cured, or a reinforcing agent to provide wear protection. It can also contain filler like carbon black or silica, glimmer, matting agent, and release additives.

The invention may extend to a substrate bearing a coating characterised in that the coating comprises the silicone-modified polyester as defined above. The coating may be fairly thin for example 20 to 25 μm and more generally from 5 to 500 μm, preferably from 15 to 100 μm. The coating may be applied in several ways to the substrate for example by spraying, curtain coating or roller coating the composition containing all ingredients.

EXAMPLES

The carbinol-functional silicone resin and the method for producing the silicone-modified polyester of the present present invention will now be described using Practical and Comparative Examples.

Practical Example 1

A 100 ml-three necked, round bottom flask fitted with a polytetrafluoroethylene (PTFE) stirrer and $N_2$ gas purge, was loaded with a mixture of 100.0 g of a raw silicone resin represented by the average unit formula:

$$(C_3H_7SiO_{3/2})_{0.3}(C_6H_5SiO_{3/2})_{0.7}$$

and having 6 mass % of silicon-bonded hydroxyl groups (a content of silicon atom-bonded hydroxyl group is 0.35 moles), 9.3 g of ethylene glycol (a content of hydroxyl group is 0.30 moles), 7.4 g of n-butyl alcohol, and 60 g of toluene. The mixture was heated up to 60° C. to dissolve all ingredients. 0.1 g of tetra-n-butyl titanate was added in to the mixture. The mixture was heated up to 105° C. and hold at 105° C. for 2.5 hours. Then, the mixture was heated up to 112° C. and hold at 112° C. for 3 hours. Toluene was removed from the mixture by vacuum. Solid carbinol-functional silicone resin was obtained.

A 100 ml-three necked, round bottom flask fitted with a polytetrafluoroethylene (PTFE) stirrer and $N_2$ gas purge, was loaded with a mixture of 34.0 g of the carbinol-functional silicone resin obtained above, 95.0 g of trimethylol propane (TMP), 66.45 g of isophtalic acid (IPA), and 29.23 g of adipic acid (AA). The mixture was heated up to 120° C. to melt all ingredients. The mixture was hold at 120° C. for 30 minutes. Then, the mixture was heated up to 180° C. and hold at 180° C. for 1 hour, then heated up to 225° C. and hold at 225° C. for 1 hour. Then clear silicone-modified polyester was obtained.

Comparative Example 1

A three necked, round bottom flask fitted with a polytetrafluoroethylene (PTFE) stirrer and $N_2$ gas purge, was loaded with a mixture of 88.14 g of a raw silicone resin represented by the average unit formula:

$$(C_3H_7SiO_{3/2})_{0.3}(C_6H_5SiO_{3/2})_{0.7}$$

and having 6 mass % of silicon-bonded hydroxyl groups, 95.0 g of trimethylol propane (TMP), 66.45 g of isophtalic acid (IPA), and 29.23 g of adipic acid (AA). The mixture was heated up to 120° C. to melt all ingredients. The mixture was heated up to 180° C. and hold at 180° C. for 1 hour. After cooling, solid silicone-modified polyester with big gel was obtained.

INDUSTRIAL APPLICABILITY

Since the carbinol-functional silicone resin of the present invention can produce the silicone-modified polyester without gelation of the silicone resin, the silicone-modified polyester can be used in a protective coating to provide durable heat-resistance, hot hardness, release and anti-graffiti for aluminum, stainless steel, iron, plastics or glass.

The invention claimed is:

1. A carbinol-functional silicone resin, wherein the carbinol-functional silicone resin is prepared by reacting a raw silicone resin having at least 1 mass % of silicon atom-bonded hydroxyl groups, silicon atom-bonded alkoxy groups, or a combination thereof, and a dihydroxy-functional compound, in the presence of a condensation catalyst and a solvent;
wherein the carbinol-functional silicone resin forms a silicone-modified polyester without gelation;
wherein the raw silicone resin is represented by the following compositional formula:

$$R^1_a(HO)_b(R^3O)_cSiO_{(4-a-b-c)/2},$$

where $R^1$ is a monovalent hydrocarbon group having 1 to 12 carbon atoms, $R^3$ is an alkyl group, and "a" is a number of from 0.8 to 1.8, provided that "b" and "c" are numbers such that at least 1 mass % of silicon atom-bonded hydroxyl groups, silicon atom-bonded alkoxy groups, or a combination thereof are present;
wherein the dihydroxy-functional compound is represented by the following general formula:

$$HO\text{---}(R^2O)_n\text{---}H,$$

where $R^2$ is an alkylene group having 2 to 12 carbon atoms, and "n" is 1; and
with the provisos that:
when the raw silicone resin has i) only silicon atom-bonded hydroxyl groups or ii) only silicon atom-bonded alkoxy groups, the dihydroxy-functional compound is reacted with the raw silicone resin in an amount such that a mole ratio of hydroxyl groups in the dihydroxy-functional compound per silicon atom-bonded hydroxyl groups or silicon atom-bonded alkoxy groups in the raw silicone resin is in a range of from 0.5 to 2.0; and
when the raw silicone resin has iii) both silicon atom-bonded hydroxyl groups and silicon atom-bonded alkoxy groups, the dihydroxy-functional compound is reacted with the raw silicone resin in an amount such that a mole ratio of hydroxyl groups in the dihydroxy-functional compound per silicon atom-bonded hydroxyl groups and silicon atom-bonded alkoxy groups in the raw silicone resin is in a range of from 0.5 to 2.0.

2. The carbinol-functional silicone resin according to claim 1, wherein the raw silicone resin is a silicone T resin.

3. The carbinol-functional silicone resin according to claim 1, wherein the dihydroxy-functional compound is a compound selected from the group consisting of ethylene glycol, propylene glycol, 1,3-butanediol, 1,4-butanediol, 1,5-pentanediol, 1,6-hexanediol, 2-methyl-1,3-propanediol, neopentyl glycol, 2-butyl-2-ethyl-1,3-propanediol, and combinations thereof.

4. The carbinol-functional silicone resin according to claim 1, wherein the condensation catalyst is a catalyst comprising metal ligand complexes.

5. The carbinol-functional silicone resin according to claim 1, wherein the reaction is carried out at a temperature of not more than 150° C.

6. A method for producing a silicone-modified polyester without gelation, the method comprising the following steps:
1) reacting a raw silicone resin having at least 1 mass % of silicon atom-bonded hydroxyl groups, silicon atom-bonded alkoxy groups, or a combination thereof, and a dihydroxy-functional compound, in the presence of a condensation catalyst and a solvent to produce a carbinol-functional silicone resin; and
2) esterifying the carbinol-functional silicone resin, a polyhydroxy-functional compound and a polycarboxyl-functional compound or derivative thereof, without using a solvent, to form the silicone-modified polyester without gelation;
wherein the raw silicone resin is represented by the following compositional formula:

$$R^1_a(HO)_b(R^3O)_cSiO_{(4-a-b-c)/2},$$

where $R^1$ is a monovalent hydrocarbon group having 1 to 12 carbon atoms, $R^3$ is an alkyl group with 1 to 6 carbon atoms, and "a" is a number of from 0.8 to 1.8, provided that "b" and "c" are numbers such that at least 1 mass % of silicon atom-bonded hydroxyl groups, silicon atom-bonded alkoxy groups, or a combination thereof are present; and
wherein the dihydroxy-functional compound is represented by the following general formula:

$$HO\text{---}(R^2O)_n\text{---}H,$$

where $R^2$ is an alkylene group having 2 to 12 carbon atoms, and "n" is 1.

7. The method according to claim 6, wherein the raw silicone resin is a silicone T resin.

8. The method according to claim 6, wherein the dihydroxy-functional compound is a compound selected from the group consisting of ethylene glycol, propylene glycol, 1,3-butanediol, 1,4-butanediol, 1,5-pentanediol, 1,6-hexanediol, 2-methyl-1,3-propanediol, neopentyl glycol, 2-butyl-2-ethyl-1,3-propanediol, and combinations thereof.

9. The method according to claim 6, with the provisos that:
when the raw silicone resin has i) only silicon atom-bonded hydroxyl groups or ii) only silicon atom-bonded alkoxy groups, the dihydroxy-functional compound is reacted with the raw silicone resin in an amount such that a mole ratio of hydroxyl groups in the dihydroxy-functional compound per silicon atom-bonded hydroxyl groups or silicon atom-bonded alkoxy groups in the raw silicone resin is in a range of from 0.5 to 2.0; and
when the raw silicone resin has iii) both silicon atom-bonded hydroxyl groups and silicon atom-bonded alkoxy groups, the dihydroxy-functional compound is reacted with the raw silicone resin in an amount such that a mole ratio of hydroxyl groups in the dihydroxy-functional compound per silicon atom-bonded hydroxyl groups and silicon atom-bonded alkoxy groups in the raw silicone resin is in a range of from 0.5 to 2.0.

10. The method according to claim 6, wherein the condensation catalyst is a catalyst comprising metal ligand complexes.

11. The method according to claim 6, wherein step 1) is carried out at a temperature of not more than 150° C.

12. The method according to claim 6, wherein the polyhydroxy-functional compound is a compound selected from the group consisting of glycerin, trimethylolpropane, trimethylolethane, trishydroxyethylisocyanurate, pentaerythritol, ethylene glycol, diethylene glycol, propylene glycol, trimethylene glycol, 1,3-, 1,2-, and 1,4-butanediols, heptanediol, hexanediol, octanediol, 2,2'-bis (4-cyclohexanol)propane, neopentyl glycol, 2,2,3-trimethylpentane-1,3-diol, 1,4-dimethylolcyclohexane, 2,2,4-trimethylpentane diol, and combinations thereof.

13. The method according to claim 6, wherein the polycarboxyl-functional compound is a compound selected from the group consisting of phthalic acid, phthalic anhydride, isophthalic acid, terephthalic acid, dimethyl terephthalate, benzophenone dicarboxylic acid, diphenic acid, 4,4-dicarboxydiphenyl ether, 2,5-pyridine dicarboxylic acid, 2,6-naphthalenedicarboxylic acid, 4-hydroxybenzoic acid, trimellitic acid, trimellitic anhydride, and combinations thereof.

14. The method according to claim 6, wherein step 2) is carried out at a temperature of not less than 150° C.

15. The carbinol-functional silicone resin according to claim 1, wherein the raw silicone resin has 1 to 50 mass % of silicon atom-bonded hydroxyl groups, silicon atom-bonded alkoxy groups, or a combination thereof.

16. The method according to claim 6, wherein the raw silicone resin has 1 to 50 mass % of silicon atom-bonded hydroxyl groups, silicon atom-bonded alkoxy groups, or a combination thereof.

* * * * *